(No Model.)
J. A. COLE.
CHRONOLOGICAL CHART.
No. 458,358. Patented Aug. 25, 1891.
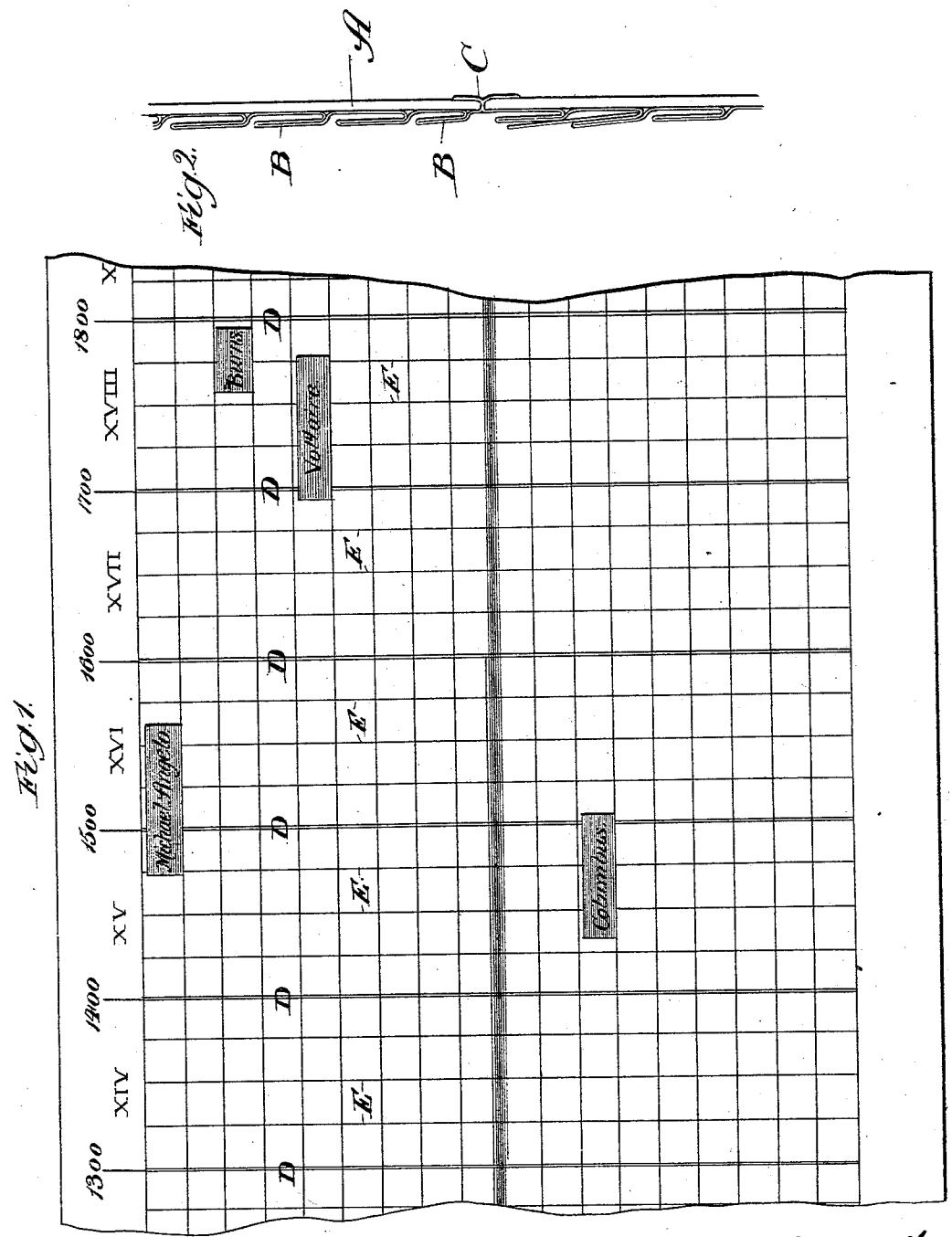
Witnesses:
Inventor:
John A. Cole,
By Banning & Banning & Payson,
Att'ys

UNITED STATES PATENT OFFICE.

JOHN A. COLE, OF CHICAGO, ILLINOIS.

CHRONOLOGICAL CHART.

SPECIFICATION forming part of Letters Patent No. 458,358, dated August 25, 1891.

Application filed March 9, 1891. Serial No. 384,277. (No model.)

*To all whom it may concern:*

Be it known that I, JOHN A. COLE, a citizen of the United States, residing at Chicago, Illinois, have invented certain new and useful Improvements in Chronological Charts, of which the following is a specification.

The object of my invention is to make a chronological chart in which periods of historical events—such as the lives of great men, the existence of dynasties, the continuance of wars, and similar important matters—may be properly located with reference to the time of their occurrence by means of a series of movable cards, which may be applied to the chart to indicate the period desired; and my invention consists in the features and details of construction hereinafter described and claimed.

In the drawings, Figure 1 is a plan view of my chronological chart, and Fig. 2 is a transverse section.

In making my chronological chart I arrange upon a suitable back A a series of cases B, which may be formed by bending a sheet of tin or other metal back upon itself, so as to form a series of lips, as shown in Fig. 2. Instead of tin or other metal, any other suitable material may be used for forming the cases, and, if desired, they may be formed in any suitable way. The object is to form a series of cases in which cards may be inserted and from which they may be removed. I also prefer to make the chart in two parts hinged together, as at C, so that they may be folded together like a book, and opened out as desired. These matters of detail, however, are susceptible of change and variation. At the top of the chart I place words or figures indicating various centuries, which may begin at any desired time. The centuries represented in different charts can be adapted to the particular period of history to which they are intended to be applicable. One chart might cover the period from the founding of Rome to the Christian era. Another chart might run from the Christian era to the time of the Crusades. Another might run from the Crusades to the present. I represent the beginning and ending of centuries on my charts by the double lines D, and indicate above the space included between the double lines the particular century intended to be represented. I then draw single lines E to represent smaller divisions of time than centuries—as, for instance, quarter-centuries. I then prepare cards adapted to be inserted into and removed from the cases B, on which are written or printed the name of the historical character or other event desired. I have represented several of these cards in place in the drawings, as Michael Angelo, Columbus, and others. The cards are cut to a length to represent the life of the man, or the duration of the particular event intended to be represented on the chart. As shown in the drawings, the location of the card with the name "Columbus" on it shows that Columbus was born during the second quarter of the fifteenth century and lived to enter the sixteenth century. The card representing Michael Angelo, as located in the drawings, shows that he was born in the latter part of the third quarter of the fifteenth century and lived until about half of the third quarter of the sixteenth century. We see at a glance that his life extended through almost a century. The card with the name "Burns" on it, on the other hand, is short, covering about a quarter and a half a quarter of a century. These instances illustrate the manner in which my chronological chart is intended to be used. In like manner might be represented the reign of the House of Hanover, the duration of the Punic wars, the destruction of Jerusalem, and every variety of historical events that one in his readings might consider desirable to include in his chart. In teaching history in school the teacher, with one of the charts hung up in sight of the scholars, might direct any particular scholar to go to the chart, and by placing a card in one of the cases indicate when the particular event named on the card occurred. As this would be done before the class, others would be able to judge whether the card was inserted in its proper place, either as to the century or the portion of the century in which the event occurred. In this way the event and the time of its occurrence would be impressed upon their minds. I mention these instances to show some of the uses to which my chronological chart may be put.

What I regard as new, and desire to secure by Letters Patent, is—

In a chronological chart, the combination of a series of cases adapted to receive cards, a series of lines crossing the cases adapted to represent periods of time, and cards of different lengths adapted to be inserted in the case and moved to the proper position to represent events and their date of occurrence and extent of duration, substantially as described.

JOHN A. COLE.

Witnesses:
    THOMAS A. BANNING,
    SAMUEL E. HIBBEN.